(12) United States Patent
Neusch (10) Patent No.: US 11,428,508 B2
(45) Date of Patent: *Aug. 30, 2022

(54) ANTI-RAM CRASH GATE

(71) Applicant: NEUSCH INNOVATIONS, LP, Marble Falls, TX (US)

(72) Inventor: William H. Neusch, Marble Falls, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/951,733

(22) Filed: Nov. 18, 2020

(65) Prior Publication Data

US 2021/0071997 A1 Mar. 11, 2021

Related U.S. Application Data (60) Continuation of application No. 16/250,489, filed on Jan. 17, 2019, now Pat. No. 10,883,801, which is a
(Continued)

(51) Int. Cl.
*E01F 13/00* (2006.01)
*F41H 11/08* (2006.01)
(Continued)

(52) U.S. Cl.
CPC ............ *F41H 11/08* (2013.01); *E01F 13/024* (2013.01); *E01F 13/046* (2013.01);
(Continued)

(58) Field of Classification Search
CPC ....... F41H 11/08; E01F 13/024; E01F 13/046; E01F 13/048; E01F 13/12; E01F 15/14;
(Continued)

(56) References Cited

U.S. PATENT DOCUMENTS 391,526 A 10/1888 Foran
923,884 A 6/1909 Picket
(Continued)

FOREIGN PATENT DOCUMENTS

| DE | 3619516 A1 | 12/1987 |
| JP | 04319193 A | 11/1992 |
| WO | 2012095650 A2 | 7/2012 |

OTHER PUBLICATIONS

International Search Report and Written Opinion, PCT/US16/35603, dated Oct. 5, 2016.
(Continued)

*Primary Examiner* — Jerry E Redman
(74) *Attorney, Agent, or Firm* — Shackelford, Bowen, McKinley & Norton, LLP; Henry L. Ehrlich (57) ABSTRACT

An exemplary crash gate to guard against motor vehicles crossing a roadway in a direction from an attack side to a protected side including a buttress post assembly secured below ground in a first concrete foundation on a side of the roadway, the buttress post assembly having two buttress posts forming a barrier passage, a latch post assembly secured below the ground in a second concrete foundation on an opposite side of the roadway, the latch post assembly having two latch posts forming a latch gap, a barrier with a gate beam disposed in the barrier passage and extending from a buttress end to a latch end, and one of a vertical pin or a hook connected to the latch post assembly and positioned in the latch gap and the other one of the vertical pin or the hook located on the latch end, when the barrier is in a closed position the latch end is located in the latch gap and the vertical pin is positioned outside of the hook.

20 Claims, 6 Drawing Sheets

Related U.S. Application Data division of application No. 15/172,141, filed on Jun. 2, 2016, now Pat. No. 10,227,742.

(60) Provisional application No. 62/171,948, filed on Jun. 5, 2015.

(51) Int. Cl.

| | | |
|---|---|---|
| *E01F 13/04* | (2006.01) | |
| *E01F 13/12* | (2006.01) | |
| *E06B 11/04* | (2006.01) | |
| *E01F 13/02* | (2006.01) | |
| *E01F 15/14* | (2006.01) | |
| *G01N 3/30* | (2006.01) | |
| *E06B 11/02* | (2006.01) | |

(52) U.S. Cl.
CPC ............ *E01F 13/048* (2013.01); *E01F 13/12* (2013.01); *E01F 15/14* (2013.01); *E06B 11/045* (2013.01); *G01N 3/30* (2013.01); *E06B 11/026* (2013.01); *G01N 2203/001* (2013.01); *G01N 2203/0019* (2013.01)

(58) Field of Classification Search
CPC ......... E06B 11/045; E06B 11/02; G01N 3/30; G01N 2203/001; G01N 2203/0019
USPC ...................................................... 49/49, 360
See application file for complete search history.

(56) References Cited

U.S. PATENT DOCUMENTS

| | | |
|---|---|---|
| 1,277,844 A | 9/1918 | Browne |
| 1,437,404 A | 12/1922 | Donovan |
| 1,449,518 A | 3/1923 | Lawson |
| 1,601,311 A | 9/1926 | Koski |
| 1,711,243 A | 4/1929 | Neeld |
| 1,969,845 A | 8/1934 | Hick |
| 2,263,649 A | 11/1941 | Sawyer |
| 2,324,726 A | 7/1943 | Sawyer |
| 2,543,893 A | 3/1951 | Chandler |
| 4,152,871 A | 5/1979 | Kardash, Jr. |
| 4,263,749 A | 4/1981 | McDougle |
| 4,576,507 A | 3/1986 | Terio |
| 4,628,638 A | 12/1986 | Elko et al. |
| 4,658,543 A | 4/1987 | Carr |
| 4,759,655 A | 7/1988 | Gorlov |
| 4,780,020 A | 10/1988 | Ferio |
| 4,844,653 A | 7/1989 | Dickinson |
| 4,858,383 A | 8/1989 | Kendig |
| 4,989,835 A | 2/1991 | Hirsh |
| 5,118,056 A | 6/1992 | Jeanise |
| 5,136,813 A | 8/1992 | Gibbs et al. |
| 5,228,237 A | 7/1993 | Nasatka |
| 5,261,187 A | 11/1993 | Prenger |
| 5,299,781 A | 4/1994 | Barrett |
| 5,395,105 A | 3/1995 | Thommen, Jr. |
| 5,406,663 A | 4/1995 | Chen |
| 5,452,544 A | 9/1995 | Weathington, Sr. |
| 5,466,088 A | 11/1995 | Nasatka |
| 5,509,754 A | 4/1996 | Conigliaro |
| 5,520,479 A | 5/1996 | Hernandez |
| 5,634,738 A | 6/1997 | Jackson et al. |
| 5,711,110 A | 1/1998 | Williams |
| 5,740,629 A | 4/1998 | Fischer et al. |
| 5,762,443 A | 6/1998 | Gelfand et al. |
| 5,829,912 A | 11/1998 | Marcotullio et al. |
| 5,847,316 A | 12/1998 | Takada |
| 5,984,569 A | 11/1999 | Chou |
| 5,987,816 A | 11/1999 | Fischer et al. |
| 6,016,629 A | 1/2000 | Sylvester et al. |
| 6,092,338 A | 7/2000 | Crowner et al. |
| 6,115,963 A | 9/2000 | Allardyce et al. |
| 6,119,399 A | 9/2000 | McCain et al. |
| 6,382,869 B1 | 5/2002 | Dickinson |
| 6,702,512 B1 | 3/2004 | Reale |
| 6,792,716 B1 | 9/2004 | Luster |
| 6,796,084 B2 | 9/2004 | Gagnon |
| 6,805,515 B2 | 10/2004 | Reale |
| 6,843,613 B2 | 1/2005 | Gelfand et al. |
| 6,857,227 B2 | 2/2005 | Russell |
| 7,040,836 B2 | 5/2006 | Rogers et al. |
| 7,062,879 B2 | 6/2006 | Wenzl et al. |
| 7,118,304 B2 | 10/2006 | Turpin et al. |
| 7,121,041 B2 | 10/2006 | Anderson et al. |
| 7,374,362 B1* | 5/2008 | Metzger .................. E01F 13/12 |
| | | 404/10 |
| 7,607,856 B2 | 10/2009 | Patel |
| 7,641,416 B2 | 1/2010 | Miracle |
| 7,699,558 B2 | 4/2010 | Adler et al. |
| 7,775,738 B2 | 8/2010 | Darcy |
| 7,818,920 B2 | 10/2010 | Causey et al. |
| 7,850,391 B2 | 12/2010 | Omar |
| 7,942,602 B2 | 5/2011 | Bunk et al. |
| 7,946,086 B2 | 5/2011 | Hammer et al. |
| 8,033,053 B2 | 10/2011 | Anderson et al. |
| 8,176,684 B2 | 5/2012 | Marchetto |
| 8,182,169 B2 | 5/2012 | Thompson et al. |
| 8,197,156 B2 | 6/2012 | Morgan et al. |
| 8,215,865 B2 | 7/2012 | Adler et al. |
| 8,277,143 B2 | 10/2012 | Adler et al. |
| 8,292,538 B2 | 10/2012 | Morgan et al. |
| 8,534,005 B2 | 9/2013 | Thomas et al. |
| 9,133,590 B2 | 9/2015 | Ball |
| 10,227,742 B2* | 3/2019 | Neusch .................. F41H 11/08 |
| 10,883,801 B2* | 1/2021 | Neusch .................. E01F 15/14 |
| 2003/0159356 A1 | 8/2003 | Russell |
| 2003/0233798 A1 | 12/2003 | Berkey et al. |
| 2004/0033106 A1 | 2/2004 | Turpin et al. |
| 2004/0175231 A1 | 9/2004 | Reale |
| 2005/0031409 A1 | 2/2005 | Behan et al. |
| 2005/0199868 A1 | 9/2005 | Morris |
| 2006/0090408 A1 | 5/2006 | Darcy |
| 2006/0288643 A1 | 12/2006 | Henshell |
| 2007/0007500 A1 | 1/2007 | Neusch |
| 2007/0086858 A1 | 4/2007 | Morgan et al. |
| 2007/0126598 A1 | 6/2007 | Carter et al. |
| 2007/0262589 A1 | 11/2007 | Moran |
| 2008/0181721 A1 | 7/2008 | Neusch |
| 2008/0226391 A1 | 9/2008 | Phillips et al. |
| 2009/0003032 A1 | 1/2009 | Philipp et al. |
| 2009/0139144 A1* | 6/2009 | Gill .......................... E06B 11/02 |
| | | 49/168 |
| 2009/0250674 A1 | 10/2009 | Darcy |
| 2010/0024307 A1 | 2/2010 | Dale et al. |
| 2011/0062403 A1 | 3/2011 | Neusch |
| 2012/0103036 A1 | 5/2012 | Meza et al. |
| 2012/0104771 A1 | 5/2012 | Johnson et al. |
| 2012/0308302 A1 | 12/2012 | Adler et al. |
| 2013/0270842 A1 | 10/2013 | Martin |
| 2014/0003867 A1 | 1/2014 | Ball |
| 2014/0223825 A1* | 8/2014 | Murray .................. E05F 15/643 |
| | | 49/29 |
| 2016/0002870 A1 | 1/2016 | Younce et al. |
| 2016/0115662 A1 | 4/2016 | Neusch |
| 2017/0321454 A1 | 11/2017 | Siebert |
| 2018/0016760 A1 | 1/2018 | Neusch |
| 2018/0119373 A1 | 5/2018 | Neusch |
| 2019/0063020 A1 | 2/2019 | Neusch |
| 2019/0186092 A1 | 6/2019 | Neusch |
| 2020/0056339 A1 | 2/2020 | Ball |

OTHER PUBLICATIONS

"Frontier Pits Terra G8 Sliding Cantilevered Gate crash test." FrontierPitts. Dec. 19, 2014, retrieved from www.youtube on Sep. 8, 2016.

"Legate Invisible Grille (New Product Luanch 2014)—Cantilever." Legate Invisible Grille. Retrieved from www.youtube on Sep. 8, 2016.

"Foundation Plan." Inova. Retrieved from www.youtube on Sep. 8, 2016.

(56) References Cited

OTHER PUBLICATIONS

ASTM F 2656-07, Standard Test Method for Vehicle Crash Testing of Perimeter Barriers, Aug. 2007.

* cited by examiner

ANTI-RAM CRASH GATE

BACKGROUND

This section provides background information to facilitate a better understanding of the various aspects of the disclosure. It should be understood that the statements in this section of this document are to be read in this light, and not as admissions of prior art.

Vehicle barrier systems are utilized to guard against access to protected areas. In particular, the systems are provided to stop motor vehicles, such as trucks, from being intentionally driven into certain areas for nefarious purposes. At least one agency of the United States Government has provided standards to certify barriers for use.

SUMMARY

An exemplary crash gate to guard against motor vehicles crossing a roadway in a direction from an attack side to a protected side including a buttress post assembly secured below ground in a first concrete foundation on a side of the roadway, the buttress post assembly having two buttress posts forming a barrier passage, a latch post assembly secured below the ground in a second concrete foundation on an opposite side of the roadway, the latch post assembly having two latch posts forming a latch gap, a barrier with a gate beam disposed in the barrier passage and extending from a buttress end to a latch end, and one of a vertical pin or a hook connected to the latch post assembly and positioned in the latch gap and the other one of the vertical pin or the hook located on the latch end, when the barrier is in a closed position the latch end is located in the latch gap and the vertical pin is positioned outside of the hook.

Another exemplary crash gate to guard against motor vehicles crossing a roadway in a direction from an attack side to a protected side including a buttress post assembly secured below ground in a first concrete foundation on a side of the roadway, the buttress post assembly comprising two buttress posts forming a barrier passage, a buttress lateral leg set in the first concrete foundation and extending away from the attack side, and a buttress longitudinal leg set in the first concrete foundation and extending substantially away from the roadway, a latch post assembly secured below the ground in a second concrete foundation on an opposite side of the roadway from the buttress post assembly, the latch post assembly comprising two latch posts forming a latch gap, a latch lateral leg set in the second concrete foundation and extending away from the attack side, and a latch longitudinal leg set in the second concrete foundation and extending away from the roadway, a barrier comprising a gate beam disposed in the barrier passage and extending from a buttress end to a latch end, the buttress end located on an opposite side of the buttress post assembly from the roadway and the buttress end having a lateral width greater than a lateral width of the barrier passage, and one of a vertical pin or a hook connected to the latch post assembly and positioned in the latch gap and the other one of the vertical pin or the hook located on the latch end, when the barrier is in a closed position the latch end is located in the latch gap and the vertical pin is positioned outside of the hook.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/ or letters in the various examples. This repetition is for the purpose of simplicity and clarity and does not in itself dictate a relationship between the various embodiments and/or configurations discussed.

Figure 1:
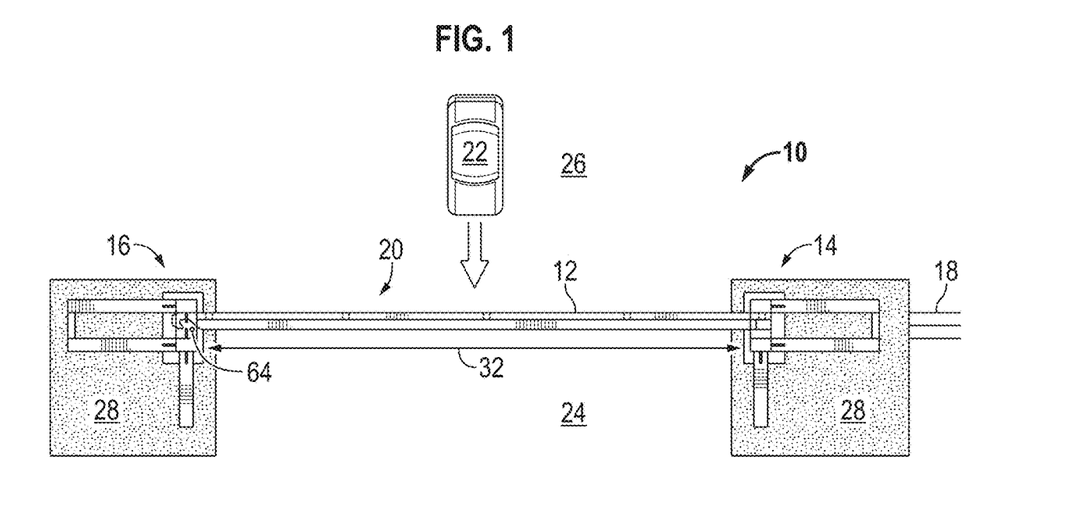
FIG. 1 is a plan view of an exemplary anti-ram crash gate according to one or more aspects of the disclosure.
Figure 2:
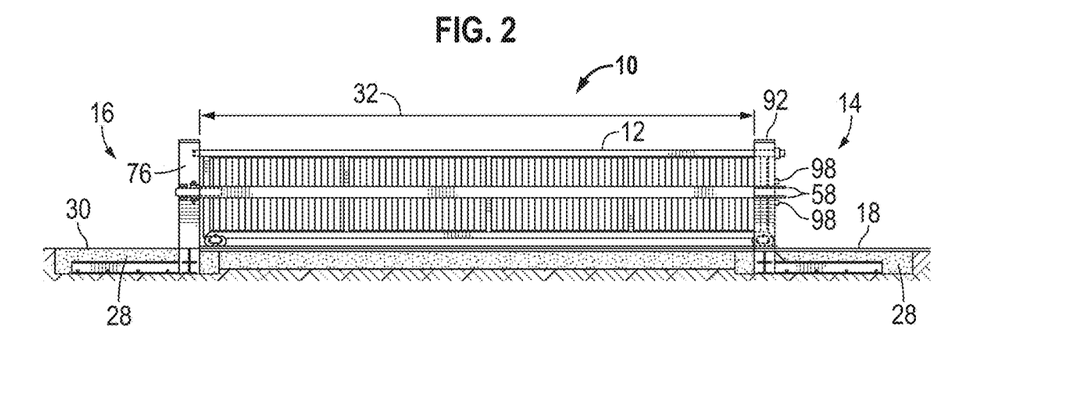
FIG. 2 is an elevation view of an exemplary anti-ram crash gate according to one or more aspects of the disclosure.
Figure 3:
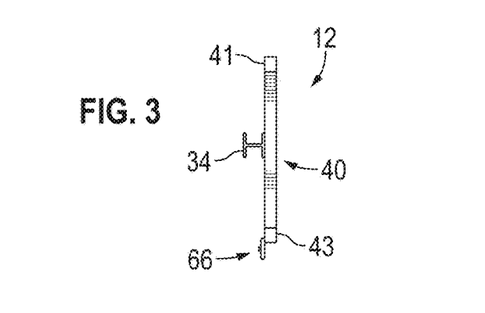
FIG. 3 is a side elevation view of an exemplary anti-ram crash gate according to one or more aspects of the disclosure.

FIGS. 1 and 2 illustrate an exemplary anti-ram crash gate assembly 10 according to one or more aspects of the disclosure described with additional reference to FIGS. 1-16. Crash gate assembly 10 includes a barrier 12 (i.e., gate) that in the closed position extends between a buttress post assembly 14 and a latch post assembly 16. Buttress post assembly 14 and latch post assembly 16 are positioned on opposite sides of a roadway 20, e.g., paved or unpaved path for motor vehicles, also referred to as an entry port. Barrier 12 can be moved laterally to the right in FIGS. 1 and 2, for example along a track 18, to the open position permitting passage across the roadway 20 between the buttress and latch post assemblies. Track 18, if utilized, may extend to latch post assembly 16.

In the closed position, crash gate assembly 10 is an anti-ram crash barrier configured to stop the penetration of a motor vehicle 22 that crashes into barrier 12. Barrier 12 should fully stop an impacting vehicle within a desired penetration distance. United States federal agencies (e.g., the U.S. Department of Defense (DOD) and the Department of State (DOS)) have developed test standards using crash tests to quantify, verify, and certify barrier performance. Such test methods were initially published by the U.S. Dept. of State in 1985 as SD-STD-02.01, which was revised in 2003 as SD-STD-02.01 Revision A, and which was replaced in 2009 with ASTM F2656-07 (Standard Test Method for Vehicle Crash Testing of Perimeter Barriers). Embodiments of the disclosed crash gate assembly 10 are configured to be crash-rated by certifying agencies such as DOD, DOS, ASTM and British Standards (BSI) and/or engineered to meet certifying agency standards. Vehicle barriers are tested by crashing a motor vehicle from a perpendicular direction into the barrier. The vehicle barrier is rated based on the test vehicles weight, the speed of impact, and the penetration of the vehicle (e.g., the cargo bed) beyond the pre-impact inside edge of the barrier. For example, a "K" or "M" designates a medium duty vehicle with a gross weight of 15,000 pounds (6810 kg). The speed ratings include K4/M30 for traveling at 28.0 to 37.9 miles per hour (mph), K8/M40 traveling at 38.0 to 46.9 mph, and K12/M50 traveling at 47.0 mph and above. The penetration ratings include P1 for less than or equal to 1 meter (3.3 ft.), P2 for 1.10 to 7 m (3.31 to 23.0 ft.), P3 for 7.01 to 30 m (23.1 to 98.4 ft.), and P4 for 30 m (98 ft.) or greater. For example, an M50-P1 crash barrier is designed to stop a medium duty truck traveling 50 mph with a penetration distance of 3.3 feet or less. Exemplary embodiments are configured to meet M50 ratings with a penetration rating of P3 or greater.

In FIG. 1, crash gate assembly 10 is positioned between a protected side 24 and motor vehicle 22 approaching from attack side 26. In accordance with aspects of the disclosure, gate assembly 10 is configured to achieve a crash-rating. According to some embodiments, gate assembly 10 is configured to achieve a crash-rating of M50-P1. An exemplary embodiment is configured to achieve a crash-rating of M50-P2.

Buttress and latch post assemblies 14, 16 are each set in concrete foundations 28 that extend below grade level 30. Roadway 20, which is blocked by closed barrier 12, extends a length 32 between the buttress and latch post assemblies. In the non-limiting examples illustrated in FIGS. 1 and 2, length 32 is for example about 28 feet and the buttress and latch post assemblies 14, 16 are each set in concrete foundations 28 that have a depth (thickness) below grade level 30 of about two feet. Concrete foundations 28 may be shallow or deep foundations. A shallow foundation may have a depth of about thirty-inches or less below grade. According to aspects of the system, concrete foundation 28 may extend about twenty-inches or less below grade. According to aspects of the system, foundation 28 may extend about twelve inches or less below grade.

FIGS. 3 to 6 illustrate an example of a barrier 12. In the illustrated example, barrier 12 is a substantially rectangular structure (i.e., frame 40) including a horizontal gate beam 34 that extends from a buttress end 36 to a latch end 38 and is located proximate to the center of gate frame 40. In a non-limiting example, gate beam 34 is a wide flange beam, for example a W6×25 beam (i.e., 6 inches deep with a weight of 25 lbs/ft.). Gate frame 40 is defined along the top and bottom sides by top and bottom horizontal members 41, 43, and on the vertical sides by first and second vertical members 42, 44. As illustrated for example in FIG. 4, top horizontal member 41 is longer than bottom horizontal member 43. First and second vertical member 42, 44 are shown connected to gate beam 34 on the attack side of gate beam 34 proximate to buttress end 36 and latch end 38. Gate frame 40 may further include vertical members 46 spaced apart along the span of gate frame 40 and connected on their ends to top and bottom horizontal members 41, 43. Gate frame 40 is a structural frame constructed for example with steel tubing. In an embodiment, horizontal members 41, 43 and vertical members 42, 44, 46 are constructed of 3-inch-by-4-inch, 11 gauge steel tubing.

Figure 4:
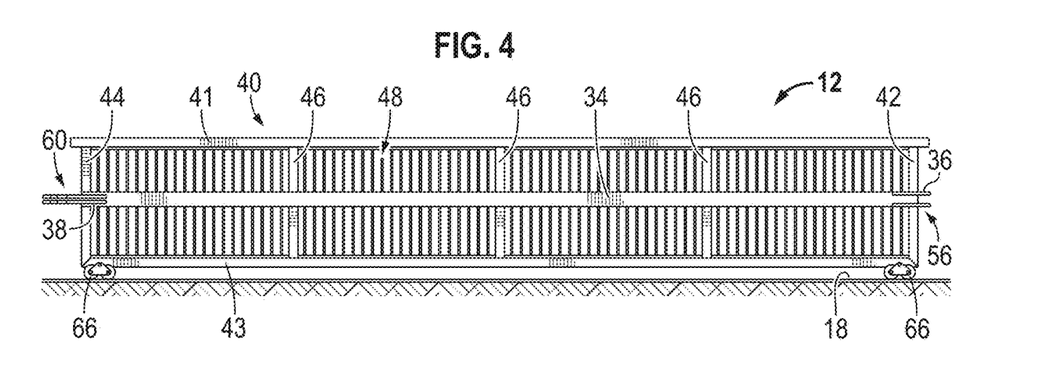
FIG. 4 is an elevation view of an exemplary barrier portion of an anti-ram crash gate according to one or more aspects of the disclosure.
Figure 5:
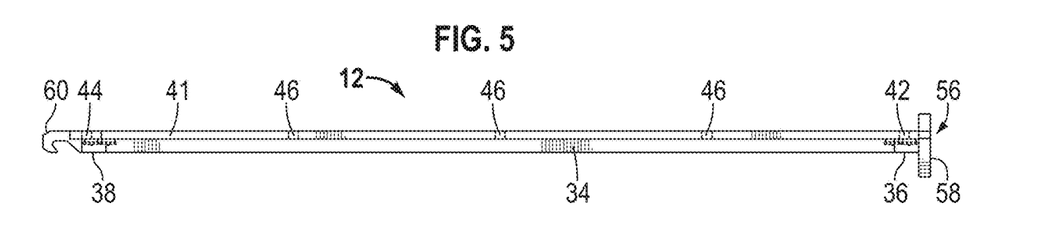
FIG. 5 is a plan view of an exemplary barrier portion of an anti-ram crash gate according to one or more aspects of the disclosure.
Figure 6:
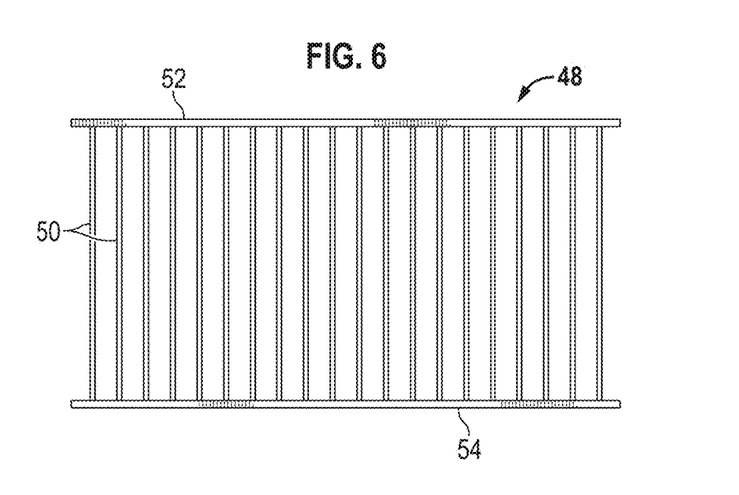
FIG. 6 is an elevation view of an exemplary panel of a barrier of an anti-ram crash gate according to one or more aspects of the disclosure.

In an exemplary embodiment, gate frame 40 includes a panel 48 shown in isolation in FIG. 6. The illustrated panels 48 are formed of spaced apart vertical pickets 50 connected to top and bottom rails 52, 54, which are connected with gate frame 40, for example between adjacent vertical members 42, 44, 46, as illustrated in FIG. 4. Vertical pickets 50 are constructed, for example, of about 0.5-inch metal pickets spaced apart about four inches on center. In an exemplary embodiment, gate frame 40 extends about thirty-feet horizontally, for example for a twenty-eight-foot roadway, and panel 48 extends vertically about four-feet between top and bottom horizontal members 41, 43 and extends horizontally about seven-feet between adjacent vertical pickets 42, 44, 46.

Figure 7:
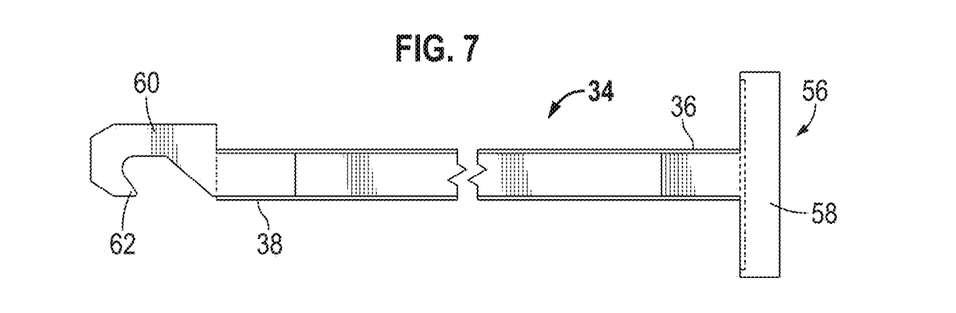
FIG. 7 is a top view of an exemplary center gate beam of a barrier of an anti-ram crash gate according to one or more aspects of the disclosure.
Figure 8:
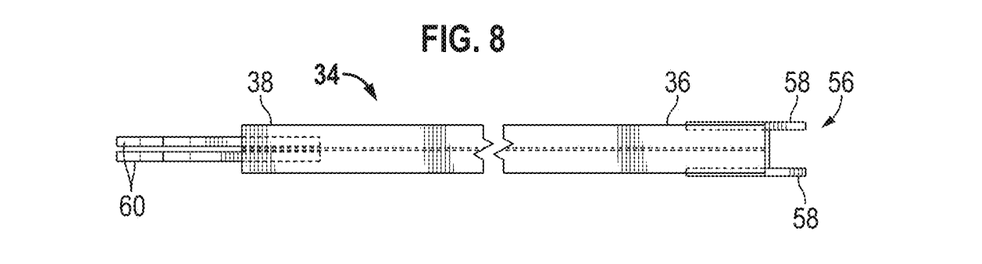
FIG. 8 is a front view of an exemplary center gate beam of a barrier of an anti-ram crash gate according to one or more aspects of the disclosure.

FIGS. 7 and 8, described with additional reference in particular to FIGS. 1-5, illustrate an exemplary center gate beam 34. A stop mechanism 56, for example a metal plate, is connected, e.g., welded, to gate beam 34 at buttress end 36. In the illustrated example, stop mechanism comprises two spaced apart stop plates 58, for example T-shaped, to contact buttress post assembly 14 when barrier 12 is in the closed position (see, e.g., FIG. 2). T-shaped buttress end 36 is larger than barrier passage 94. In at least one embodiment, stop plates 58 are constructed of a one-inch steel plate. A latch 60 is connected at latch end 38 of gate beam 34 and includes a first latch member 62 to operationally connect with a second latch member 64 at latch post assembly 16 (see, e.g. FIG. 1). In the non-limiting examples, first latch element 62 comprises a hook and second latch member 64 is a pin. In the example of FIG. 8, latch 60 is formed of two metal plates that are spaced apart and connected to gate beam 34.

Figure 9:
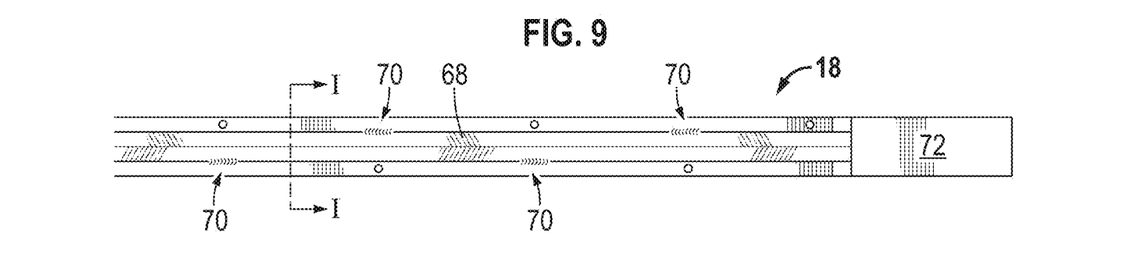
FIG. 9 is a plan view of an exemplary portion of a track of an anti-ram crash gate according to one or more aspects of the disclosure.
Figure 10:
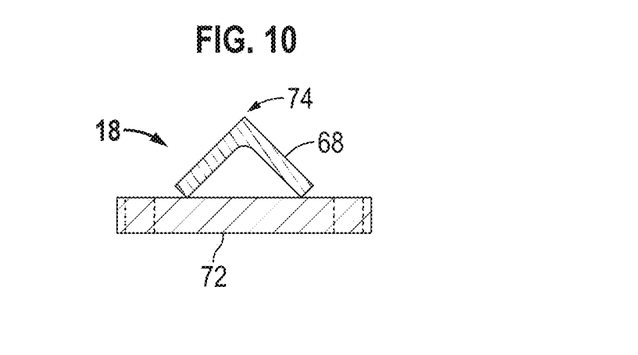
FIG. 10 is a sectional view of the track along the line I-I of FIG. 9.

Referring back to FIGS. 2-4, barrier 12 may include rollers 66, e.g., wheels, along the bottom side to move the barrier along track 18. FIGS. 9 and 10 illustrate an example of track 18. Track 18 may include angle iron 68 connected, for example by welds 70, to a base plate 72 to form a peak 74 that may be disposed in the groove in rollers 66.

Figure 11:
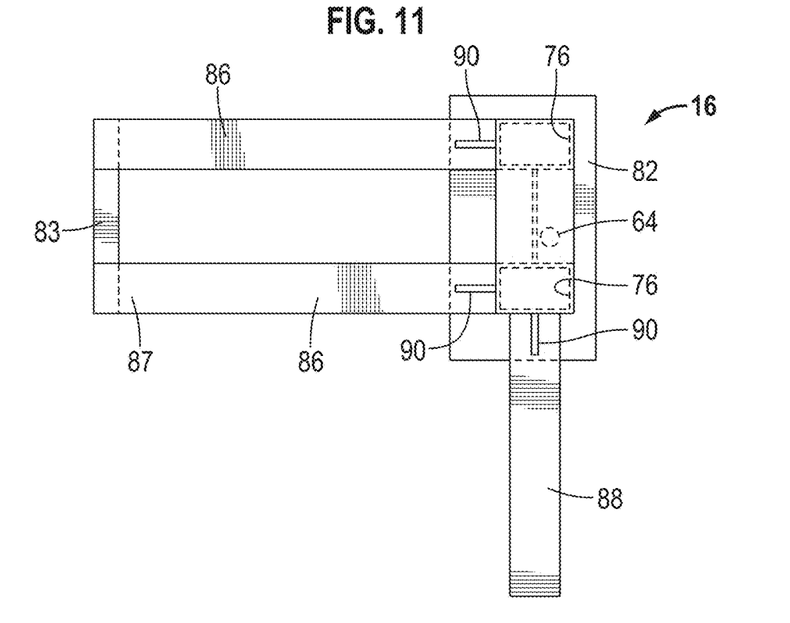
FIG. 11 is a plan view of an exemplary latch post assembly of an anti-ram crash gate according to one or more aspects of the disclosure.
Figure 12:
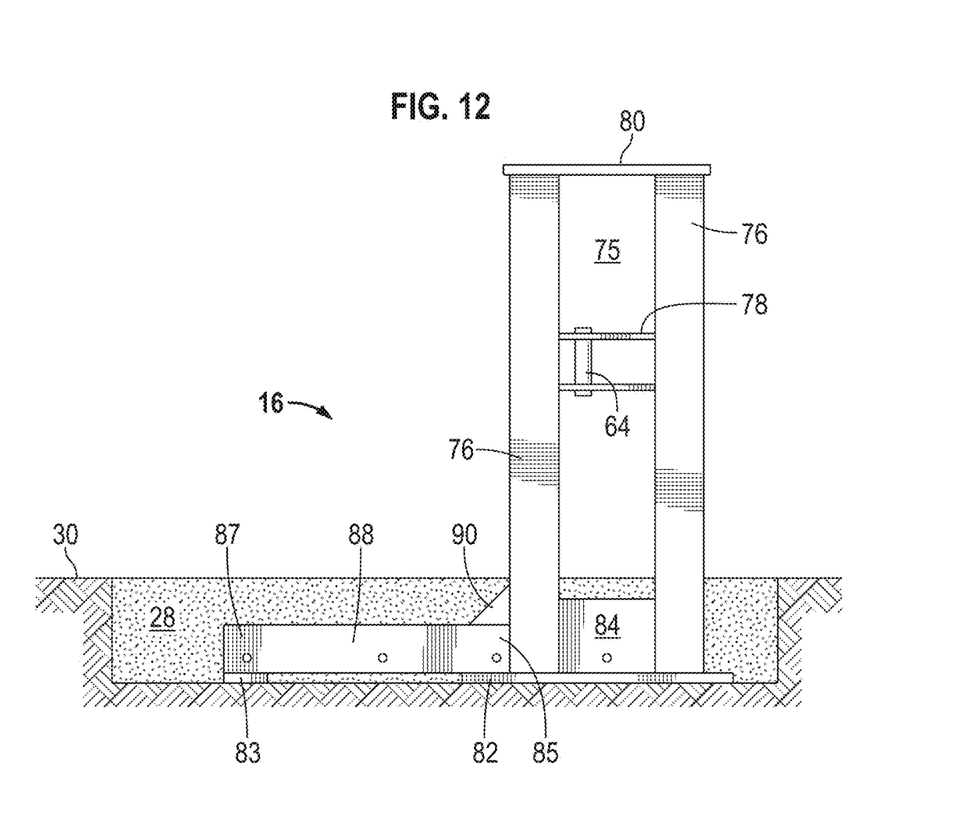
FIG. 12 is an elevation view of an exemplary latch post assembly of an anti-ram crash gate according to one or more aspects of the disclosure.
Figure 13:
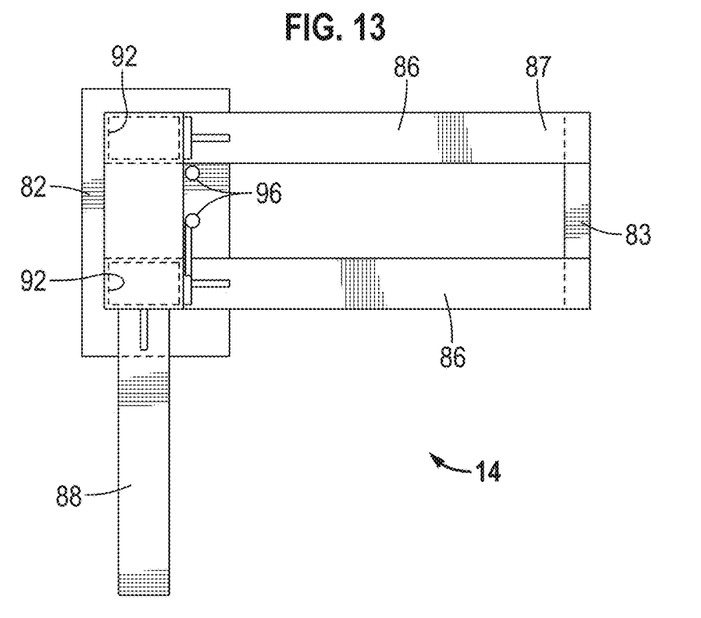
FIG. 13 is a plan view of an exemplary buttress post assembly of an anti-ram crash gate according to one or more aspects of the disclosure.
Figure 14:
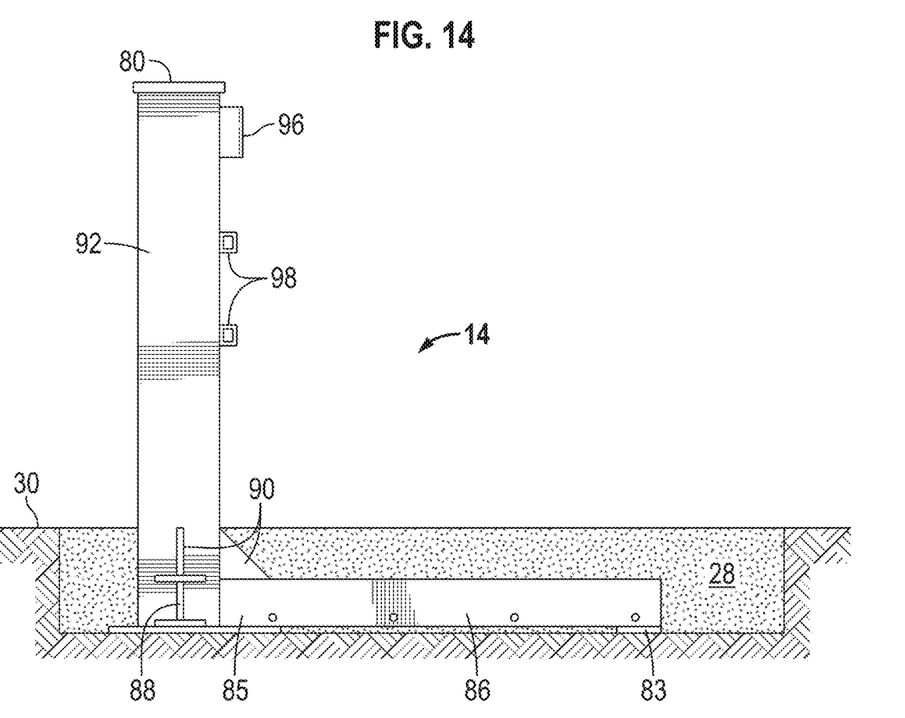
FIG. 14 is an elevation view of an exemplary buttress post assembly of an anti-ram crash gate according to one or more aspects of the disclosure.
Figure 15:
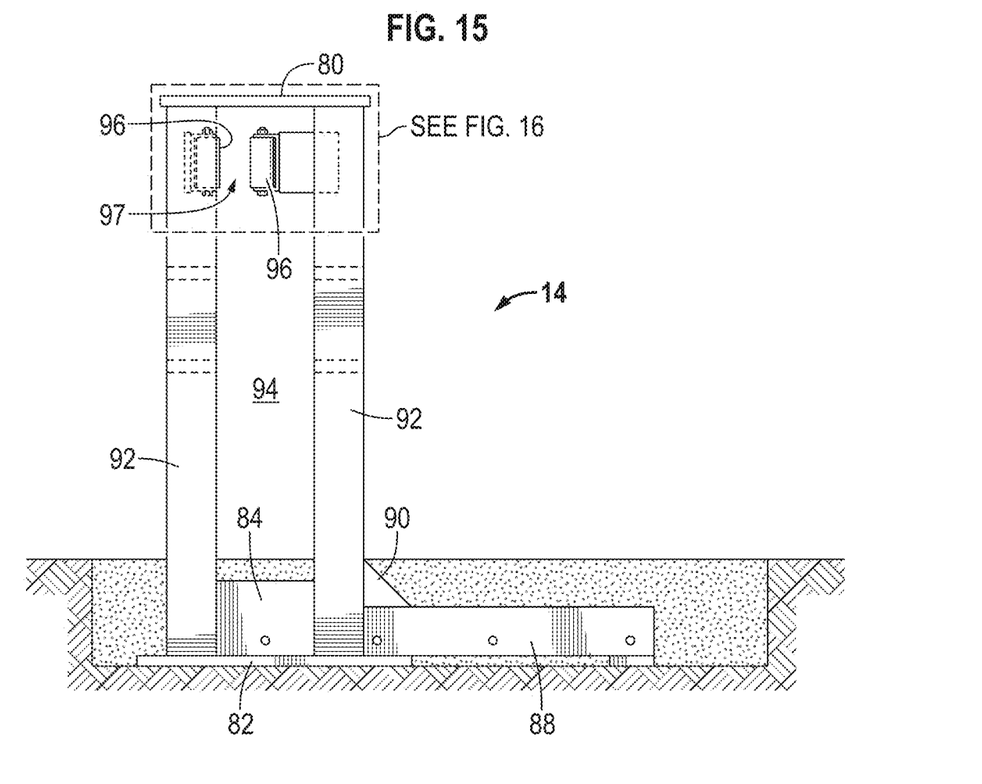
FIG. 15 is a side elevation view of an exemplary buttress post assembly of an anti-ram crash gate according to one or more aspects of the disclosure.
Figure 16:
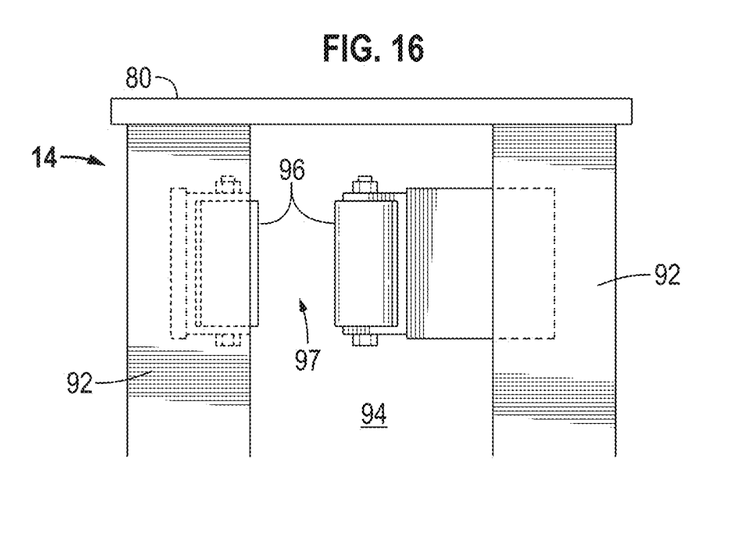
FIG. 16 is an exploded view of a roller section of the buttress post assembly of FIG. 15.

FIGS. 11 and 12 illustrate an example of a latch post assembly 16 according to aspects of the disclosure described with reference to FIGS. 1-6. Latch post assembly 16 includes a pair of vertical latch posts 76 that are spaced apart to form a gap 75 into which at least first latch member 62, connected to latch end 38 of barrier 12 and gate beam 34, can be disposed to connect with second latch member 64 of latch post assembly 16. In the illustrated example, second latch member 64 is a pin (e.g., metal rod), which is connected to latch posts by strut members 78.

Latch posts 76 are connected to one another, for example, at the top ends with a cap plate 80 and proximate the bottom ends by a base plate 82 and a gusset plate 84. A longitudinal leg 86 extends outward from the bottom of each latch post 76 in a direction parallel to barrier 12 (see, e.g., FIGS. 1 and 2), which is referred to as the longitudinal direction. In the illustrated examples, longitudinal leg 86 extends outward in the direction away from the roadway. The pair of longitudinal legs 86 may be connected at their first ends 85 to the respective latch posts 76 and base plate 82 and connected together proximate to their second ends 87 by a spacer base plate 83. A lateral ground leg 88 is connected at its first end proximate the bottom end of latch post 76 on the protected side and extends substantially perpendicular to barrier 12 (longitudinal direction) and toward the protected side. Each of legs 86, 88 may further be supported by a brace plate 90 connected between the first end and respective latch post 76. In a non-limiting example, latch posts 76 are constructed of a 12-inch-by-8-inch, 0.5-inch thick steel tubing, legs 86, 88 are constructed of 8-inch, 31-lbs/foot wide flange beams (W8×31), and second latch member 64 is a 2.5-inch diameter steel rod connected to the latch posts with 1-inch steel plates 78.

FIGS. 13 to 16 illustrate an example of a buttress post assembly 14 according to aspects of the disclosure described with reference to FIGS. 1-6. Buttress post assembly 14 includes a pair of vertical buttress posts 92 that are spaced apart to form a passage 94 in which barrier 12 is disposed. A pair of rollers 96 are connected with buttress post assembly 14 to provide a pathway 97 between the rollers in which barrier 12 is positioned. Pathway 97 is sized proximate to the width of barrier 12 to provide structural strength and support to the barrier.

A pair of vertically spaced apart stops 98 are located on the opposite side of buttress posts 92 from the roadway for disposing stop plates 58 on gate beam 34 when barrier 12 is in the closed position, see e.g., FIG. 2. In an embodiment, stops 98 are constructed of 2-inch-by-2-inch steel bar.

Buttress posts 92 are connected to one another for example at the top ends with a cap plate 80 and proximate the bottom ends by a base plate 82 and gusset plate 84. A longitudinal leg 86 extends horizontally outward from the bottom of each buttress post 92 in a direction parallel to barrier 12 (see, e.g., FIGS. 1 and 2). In the illustrated examples, longitudinal leg 86 extends outward in the direction away from the roadway. The pair of longitudinal legs 86 may be connected at their first ends 85 to the respective buttress posts 92 and base plate 82 and connected together proximate to their second ends 87 by a spacer base plate 83. A lateral leg 88 is connected at its first end proximate to the bottom end of the buttress post and extends substantially perpendicular to barrier 12 and toward protected side 24. Each of the ground support legs 86, 88 may further be supported by a brace plate 90 that is connected between the first end and the respective buttress post 92. In a non-limiting example, buttress posts 92 are constructed of a 12-inch-by-8-inch, 0.5-inch thick steel tubing, and legs 86, 88 are W8×31 beams.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions, and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A crash gate to guard against motor vehicles crossing a roadway in a direction from an attack side to a protected side, comprising:
    a buttress post assembly secured below ground in a first concrete foundation on a side of the roadway, the buttress post assembly comprising two buttress posts forming a barrier passage;
    a latch post assembly secured below the ground in a second concrete foundation on an opposite side of the roadway from the buttress post assembly, the latch post assembly comprising two latch posts forming a latch gap;
    a barrier comprising a gate beam disposed in the barrier passage and extending from a buttress end to a latch end; and
    a first one of a vertical pin or a hook connected to the latch post assembly and positioned in the latch gap and a second one of the vertical pin or the hook located on the latch end, wherein when the barrier is in a closed position the latch end is located in the latch gap and the vertical pin is positioned outside of the hook.

2. The crash gate of claim 1, wherein the first and the second concrete foundations are shallow foundations having a depth of about thirty inches or less.

3. The crash gate of claim 1, wherein the first and second concrete foundations have a depth of about two feet or less.

4. The crash gate of claim 1, wherein the first and second concrete foundations have a depth of about twelve inches or less.

5. The crash gate of claim 1, wherein:
    the buttress post assembly further comprises a buttress lateral leg that is set in the first concrete foundation and extending substantially perpendicular to the barrier; and
    the latch post assembly further comprises a latch lateral leg that is set in the second concrete foundation and extending substantially perpendicular to the barrier.

6. The crash gate of claim 5, wherein the first and the second concrete foundations have a depth of about twelve inches or less.

7. The crash gate of claim 1, wherein the buttress end is located on an opposite side of the buttress post assembly from the roadway and the buttress end is larger than the barrier passage.

8. The crash gate of claim 1, wherein:
the buttress post assembly further comprises a buttress lateral leg that is set in the first concrete foundation and extending substantially perpendicular to the barrier and away from the attack side, and a buttress longitudinal leg that is set in the first concrete foundation and extending substantially parallel to the barrier and away from the roadway; and
the latch post assembly comprises a latch lateral leg that is set in the second concrete foundation and extending substantially perpendicular to the barrier and away from the attack side, and a latch longitudinal leg that is set in the second concrete foundation and extending substantially parallel to the barrier and away from the roadway.

9. The crash gate of claim 1, wherein the gate beam is an I-beam;
the hook is located on the latch end and the hook is open on the protected side; and
the buttress end is located on an opposite side of the buttress post assembly from the roadway and the buttress end is larger than the barrier passage.

10. The crash gate of claim 1, wherein the barrier is mounted on a sliding mechanism extending across the roadway.

11. The crash gate of claim 1, wherein the crash gate is configured to arrest an impacting motor vehicle of about 15,000 pounds traveling at a speed of about 47 miles per hour or greater on impact in a direction from the attack side to the protected side within a distance from the barrier of about 100 feet or less.

12. The crash gate of claim 11, wherein the first and the second concrete foundations are shallow foundations having a depth of about twelve inches or less.

13. The crash gate of claim 11, wherein the first and second concrete foundations have a depth of about two feet or less.

14. The crash gate of claim 11, wherein the distance is about 23 feet or less.

15. The crash gate of claim 14, wherein the first and the second concrete foundations are shallow foundations having a depth of about twelve inches or less.

16. A crash gate to guard against motor vehicles crossing a roadway in a direction from an attack side to a protected side, comprising:
a buttress post assembly secured below ground in a first concrete foundation on a side of the roadway, the buttress post assembly comprising:
two buttress posts forming a barrier passage;
a buttress lateral leg set in the first concrete foundation and extending away from the attack side; and
a buttress longitudinal leg set in the first concrete foundation and extending substantially away from the roadway;
a latch post assembly secured below the ground in a second concrete foundation on an opposite side of the roadway from the buttress post assembly, the latch post assembly comprising:
two latch posts forming a latch gap;
a latch lateral leg set in the second concrete foundation and extending away from the attack side; and
a latch longitudinal leg set in the second concrete foundation and extending away from the roadway;
the first concrete foundation and the second concrete foundation having a depth of about twelve inches or less;
a barrier comprising a gate beam disposed in the barrier passage and extending from a buttress end to a latch end, the buttress end located on an opposite side of the buttress post assembly from the roadway and the buttress end having a lateral width greater than a lateral width of the barrier passage; and
a first one of a vertical pin or a hook connected to the latch post assembly and positioned in the latch gap and a second one of the vertical pin or the hook located on the latch end, wherein when the barrier is in a closed position the latch end is located in the latch gap.

17. The crash gate of claim 16, wherein the gate beam is an I-beam;
the latch posts are constructed of 12-inch by 8-inch steel tubing; and
the buttress posts are constructed of 12-inch by 8-inch steel tubing.

18. The crash gate of claim 16, wherein the crash gate is configured to arrest an impacting motor vehicle of about 15,000 pounds traveling at a speed of about 47 miles per hour or greater on impact in a direction from the attack side to the protected side within a distance from the barrier of about 23 feet or less.

19. The crash gate of claim 16, wherein the vertical pin is positioned outside of the hook when the barrier is in the closed position.

20. The crash gate of claim 19, wherein the vertical pin is located on the latch end.

* * * * *